(12) United States Patent
Grenfell

(10) Patent No.: US 9,911,229 B2
(45) Date of Patent: Mar. 6, 2018

(54) TRANSMISSION AND CONFIGURATION OF THREE DIMENSIONAL DIGITAL CONTENT

(71) Applicant: Adobe Systems Incorporated, San Jose, CA (US)

(72) Inventor: Desmond Thomas Grenfell, Lancashire (GB)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 15/186,109

(22) Filed: Jun. 17, 2016

(65) Prior Publication Data

US 2017/0365096 A1 Dec. 21, 2017

(51) Int. Cl.
*G06T 17/20* (2006.01)
*G06T 15/08* (2011.01)

(52) U.S. Cl.
CPC .............. *G06T 17/20* (2013.01); *G06T 15/08* (2013.01)

(58) Field of Classification Search
None
See application file for complete search history.

(56) References Cited

U.S. PATENT DOCUMENTS

| 6,438,266 | B1* | 8/2002 | Bajaj | G06T 9/001 382/154 |
|---|---|---|---|---|
| 2005/0138096 | A1* | 6/2005 | Wintermantel | G01S 7/2927 708/300 |
| 2008/0186309 | A1* | 8/2008 | D'Amora | G06T 17/00 345/419 |

* cited by examiner

*Primary Examiner* — Kee M Tung
*Assistant Examiner* — Yanna Wu

(57) ABSTRACT

Transmission and configuration of three dimensional digital content is described. In one or more implementations, three-dimensional digital content is received having a three-dimensional mesh of a plurality of vertices. Each vertex includes a definition of a characteristic of the three-dimensional content. The definition of the characteristic is transformed for each vertex from a floating point representation to a fixed point representation. The fixed point representation includes a plurality of values that have different amounts of significance in defining the characteristic, one to another. The plurality of values is indexed of the fixed point representation of the definition of the characteristic. The indexing is based on the different amounts of significance, one to another. Output of the three dimensional digital content is controlled based on the indexed plurality of values.

12 Claims, 11 Drawing Sheets

TRANSMISSION AND CONFIGURATION OF THREE DIMENSIONAL DIGITAL CONTENT

BACKGROUND

Three dimensional digital content is created through use of a three dimensional mesh of vertices and polygons (e.g., triangles) formed by these vertices to form a surface of the content. Each of these vertices are further associated with a definition of a plurality of characteristics used to form the three dimensional digital content. Examples of these defined characteristics include a coordinate in three dimensional space (e.g., x, y, and z directions), a texture, a surface normal (e.g., a surface as a vector that is perpendicular to a tangent plane to that surface), shading, and so forth.

Accordingly, three dimensional digital content is typically defined using a vast amount of data as each vertex used to form the mesh is further associated with a variety of defined characteristics at that vertex. This vast amount of data, however, may hinder an ability to both render the digital content and transmit the content in an efficient manner. Consequently, this may limit applicability of three dimensional digital content from certain scenarios, such as sales and commercial applications where a user's attention span is at a premium. For example, a typical user often forgoes interaction with even two dimensional digital content (e.g., a webpage) when that content "takes too long" to be transmitted to and rendered by a browser. Thus, this user will also typically forgo interaction with three dimensional digital content using conventional techniques as these techniques may consume an even greater amount of time to transmit and render.

A variety of conventional techniques have been developed to solve these challenges. In one example, a mesh compression technique is used to remove redundancy and rearrange polygon descriptions to exploit shared vertices between neighboring polygons. Examples of this include creation of fans or strips of triangles. However, efficiency of this technique is dependent on the topology of the mesh and thus can have limited effectiveness in some situations and may also reduce richness of the content.

In another conventional example, a series of meshes are generated by a user in a supervised manner. The user, as part of generating this series of meshes, is tasked in this conventional example with avoiding use of lower resolution data that does not contribute to a final high resolution model. This is avoided since this data increases overall size of the model for both transmission and rendering, which is inefficient and runs counter to a purpose of trying to increase efficiency in transmission and rendering of a final full resolution version of the content. In conventional techniques, this is supervised manually by the user to form each of the meshes in this series and thus may be inefficient, time consuming, and prone to error.

SUMMARY

Transmission and configuration of three dimensional digital content is described. In one or more implementations, three-dimensional digital content is received having a three-dimensional mesh of a plurality of vertices. Each vertex includes a definition of a characteristic of the three-dimensional content. Examples of characteristics include position, texture, shading, and so forth.

The definition of the characteristic is transformed for each vertex from a floating point representation to a fixed point representation. The fixed point representation includes a plurality of values that have different amounts of significance in defining the characteristic, one to another. For example, the fixed point representation may include three bytes that are used to successively refine a definition of a characteristic, e.g., position of a vertex and so forth.

The plurality of values is indexed of the fixed point representation of the definition of the characteristic. The indexing is based on the different amounts of significance, one to another. Output of the three dimensional digital content is controlled based on the indexed plurality of values, such as to transmit and render vertices from most significant to least significant values of the fixed point representations.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
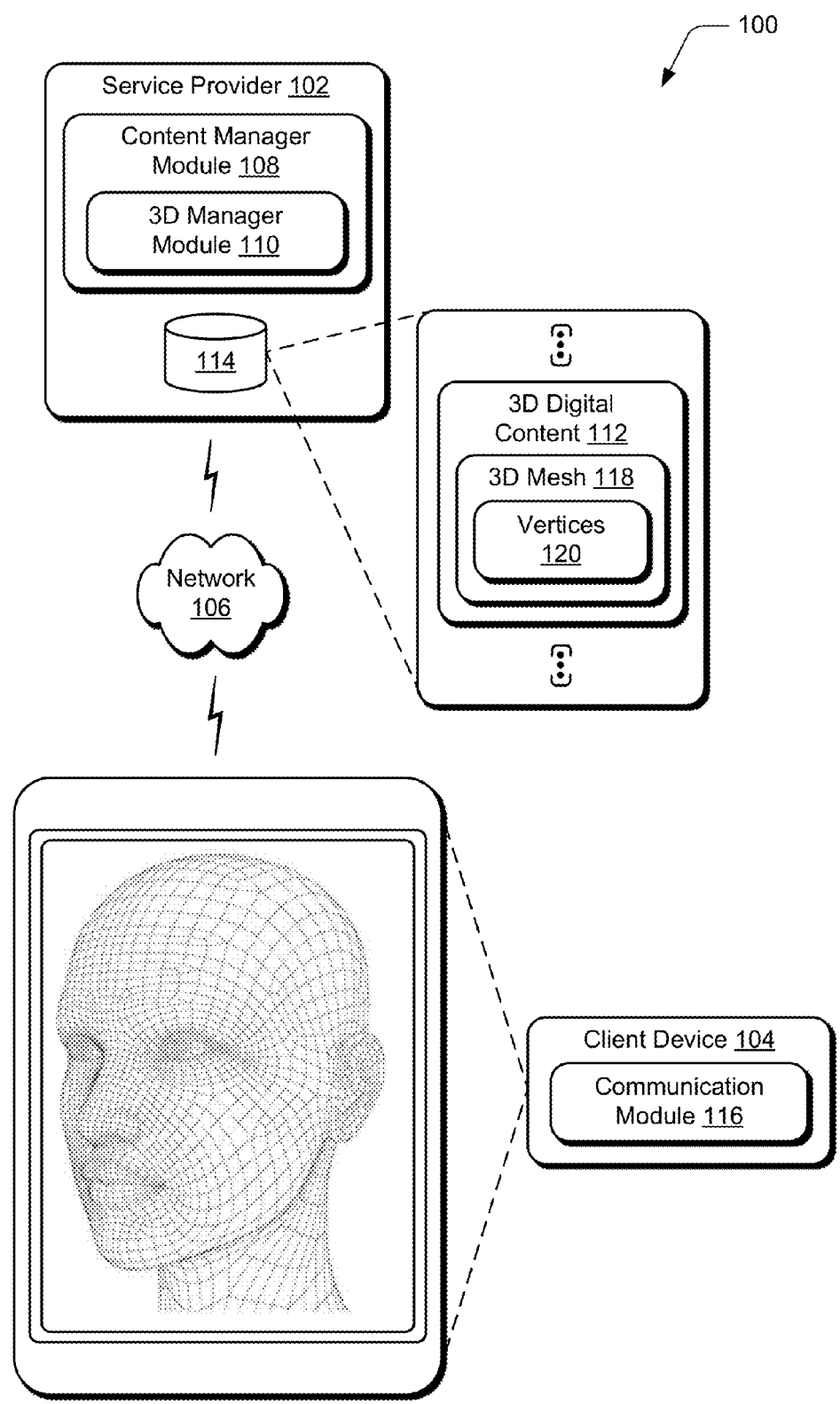
FIG. 1 is an illustration of an environment in an example implementation that is operable to employ transmission and configuration techniques described herein.

Three dimensional digital content transmission and rendering techniques are described. These techniques enable a three dimensional mesh of arbitrary topology to be incrementally output, e.g., transmitted or rendered. Incremental output as described herein minimizes both the time before a user is able to see a recognizable geometry and a time to deliver an entirety of the three dimensional digital content, e.g., the entire full resolution mesh. Further, these techniques may be performed in an unsupervised manner without user input, thereby improving efficiency and accuracy over conventional techniques that relied on manually created series of meshes.

In one example, the techniques are applied to make a determination as to an order in which to transmit components of a three dimensional mesh, e.g., based on visibility and size. To do so, these techniques transform floating point representations used to define characteristics of the three dimensional content to fixed point representations. Characteristics of the three dimensional content, for instance, include a coordinate in three dimensional space (e.g., x, y, and z directions), a texture, a surface normal (e.g., a surface as a vector that is perpendicular to a tangent plane to that surface), shading, and so forth for each vertex in the mesh.

The fixed point representation is formed to include a series of values, each of which has different amounts of significance to the definition of a corresponding characteristic. A floating point value, for instance, may be used to define a coordinate of a vertex in three dimensional space, e.g., x, y, and z directions. The floating point value is converted to a fixed point representation having a series of bytes. Each of the bytes in the series is configured to further refine a location defined by the representation, i.e., from a general location to increasingly more accurate locations through increasing larger combinations of the bytes. In this way, the first byte in this series has a larger amount of significance toward the definition of the position characteristic than later bytes in the series. Similar functionality may also be achieved for other characteristics, such as texture, surface normals, shading, and so forth for vertices in the three dimensional mesh of the three dimensional digital content.

The different amounts of significance are then indexed and used to control output of the three dimensional digital content, e.g., transmission over a network and/or rendering by a device. Continuing with the previous example, the first byte in the series of a fixed point representation for each of the vertices of a location characteristic is first transmitted. In this way, this first byte gives a generalized location of the three dimensional mesh of the content.

This is followed by the first byte in the series of a fixed point representation of a texture characteristic, and thus may provide color and generalized "look and feel" of the content at those locations. This process may continue down the series of bytes for each of the characteristics which, although having lesser amounts of significance to the definition of respective characteristics, act to further refine a definition of the respective characteristics. For example, colors, locations, shadings, and so forth may be further refined as these bytes are successively transmitted and rendered in real time. In this way, progressive transmission and rendering is achieved using an unsupervised technique such that a user may quickly view and interact with the three dimensional digital content as it is being refined, e.g., to move a model formed by the content.

These techniques may also leverage additional considerations as part of indexing the three dimensional digital content to control transmission and rendering of the content. These considerations include visibility and size of polygons formed from vertices of the mesh. Further discussion of these and other examples is included in the following sections.

In the following discussion, an example environment is first described that may employ the transmission and rendering techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ techniques described herein. The illustrated environment 100 includes a service provider 102 and a client device 104 that are communicatively coupled, one to another, via a network 106, e.g., the Internet, a wide area network, a local area network. Computing devices that implement the service provider 102 and the client device 104 may be configured in a variety of ways.

A computing device, for instance, may be configured as a desktop computer, a laptop computer, a mobile device (e.g., assuming a handheld configuration such as a tablet or mobile phone as illustrated), and so forth. Thus, a computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud".

The service provider 102 is illustrated as including a content manager module 108. The content manager module 108 is implemented at least partially in hardware of a computing device to manage creation, configuration, storage, and transmission of three dimensional (3D) digital content 112, which is illustrated as stored in storage 114. The 3D manager module 110, for instance, may configure to 3D digital content 112 for communication over the network 106 for rendering by a communication module 116 of the client device 104. The communication module 116 may be configured in a variety of ways, such as a 3D content viewer, browser, network-enabled application, operating system, and so forth.

The 3D content 112 is formed as a 3D mesh 118 having a plurality of vertices 120. As previously described, each of the vertices 120 is associated with a variety of data that defines characteristics of the 3D digital content 112, such as coordinates, textures, and so forth. Thus, the 3D digital content 112 may consume a vast amount of data, which may challenge efficiency in transmission over the network 106 and rendering by the client device 104.

Accordingly, the 3D manager module 110 is configured to reduce an overall amount of time to fully transmit the 3D digital content 112 over the network 106 to the client device 104 in comparison with conventional techniques. Further, 3D manager module 110 may do so in an incremental manner that keeps a user of the client device 104 engaged and informed as this transmission and rendering occurs.

The 3D manager module 110 is configured to incrementally transmit a 3D mesh 118 having an arbitrary topology in a manner that minimizes an amount of time before a user of the client device 104 begins to see recognizable geometry of the 3D digital content 112. These techniques also minimize an amount of time taken to deliver the full resolution mesh as a whole, which is not possible in conventional progressive techniques. Further, this may be performed without any additional supervised authoring as required in conventional progressive techniques. An example of this if further described beginning with following discussion and corresponding figures.

Figure 2:
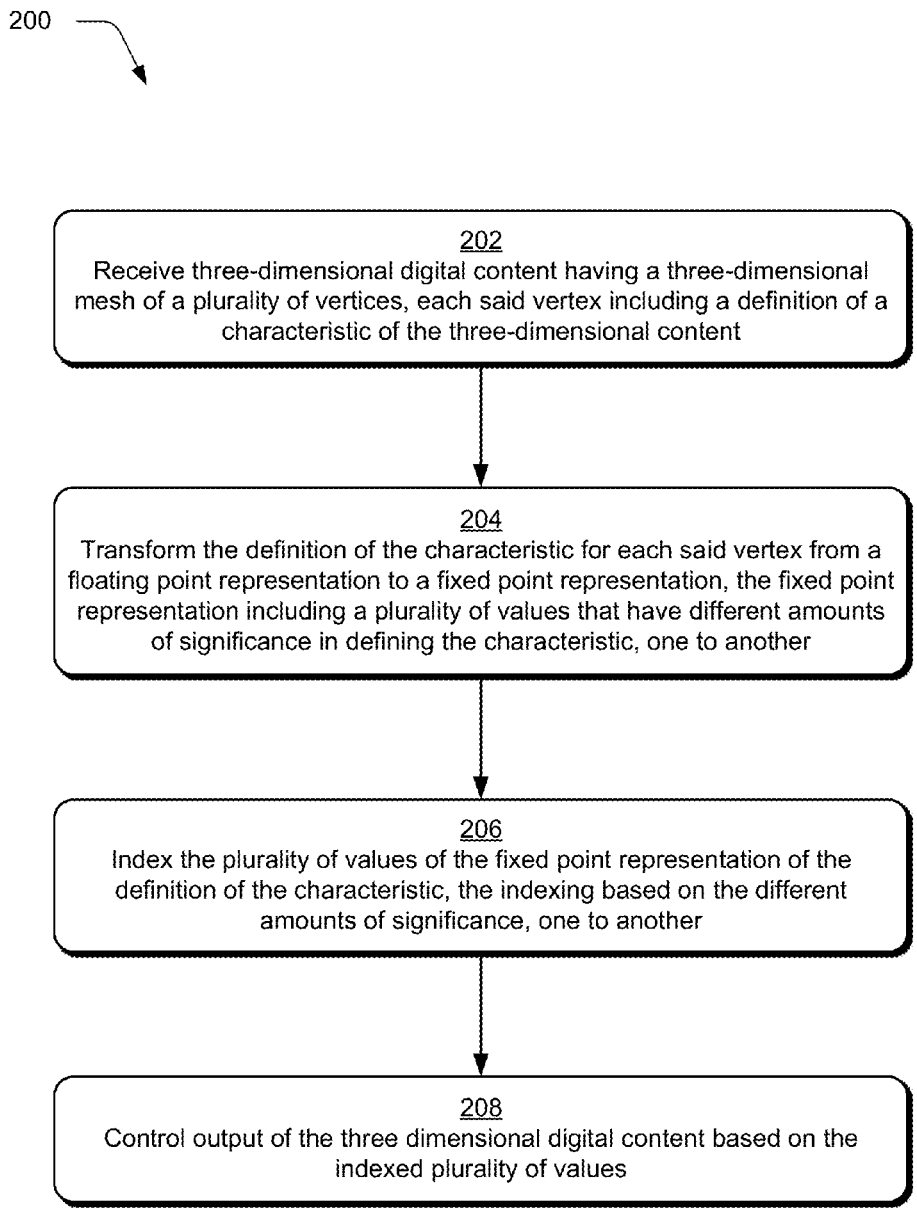
FIG. 2 is a flow diagram depicting a procedure in an example implementation in which three dimensional (3D) digital content is configured for efficient transmission and rendering.
Figure 3:
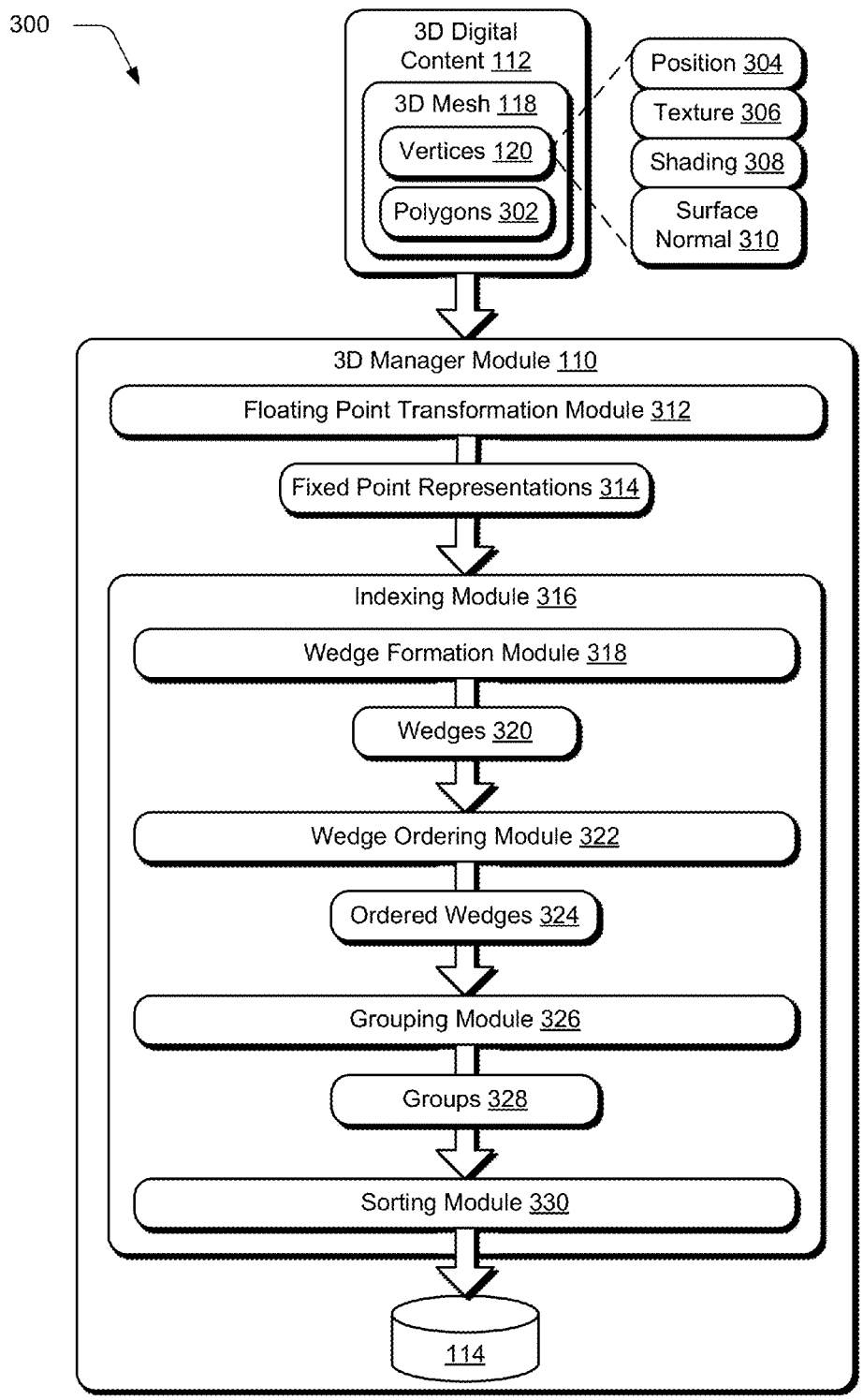
FIG. 3 depicts a system in an example implementation showing operation of a three dimensional manager module of FIG. 1 in greater detail as configuring three dimensional digital content for efficient transmission and rendering.

FIG. 2 depicts a procedure 200 in an example implementation in which 3D digital content 112 is configured for efficient transmission and rendering. FIG. 3 depicts a system 300 in an example implementation showing operation of the 3D manager module 110 of FIG. 1 in greater detail as configuring 3D digital content for efficient transmission and rendering.

The following discussion describes techniques that may be implemented utilizing the previously described systems and devices. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In portions of the following discussion, reference will be made interchangeably to both FIGS. 2 and 3.

To begin, three-dimensional digital content 112 is received having a three-dimensional mesh 118 of a plurality of vertices 120. Each vertex 120 includes a definition of a characteristic of the three-dimensional content (block 202). For example, the 3D mesh 118 is described using a list of vertices 120 together with a set of polygons 302 defined in reference to the vertices 120. In the following discussion, an example of the polygons 302 are referenced as triangles although other shapes are also contemplated.

Each of the vertices 120 is associated with a definition of a characteristic of the three dimensional digital content 112. One such example is a position 304 of the vertex 120 in three dimensional space, such as in x, y, z Cartesian space. In addition, each vertex 120 may define other characteristics such as a texture 306 (e.g., a 2D texture coordinate), shading 308, a surface normal 310, and other characteristics. A texture 306 defines characteristics of colors that are overlaid over the 3D mesh 118 at the vertex 120. Shading 308 describes characteristics of shading at the vertex 120, e.g., an effect from virtual or environmental light sources. A surface normal 310 is defined in relation to a surface at a point "P" of the vertex 120 is a vector that is perpendicular to a tangent plane to that surface at point "P." Other characteristics of the 3D digital content 112 are also contemplated as being defined in relation to the vertices 120.

Vertices 120 are typically expressed as part of the 3D mesh 118 using floating point representations using either single or double precision. Floating point denotes a mode of representing a number as two sequences of bits, one representing the digits in the number and the other an exponent that determines a position of a radix point, i.e., decimal point or binary point. The radix point can "float" and thus may be placed anywhere relative to the significant digital of the number. Floating point is generally used to support a tradeoff between range and precision. The number is, in general, represented approximately to a fixed number of significant digits (i.e., the significand) and scaled using an exponent in some fixed base, e.g., two, ten, or sixteen. See IEEE 754 Standard.

A floating point transformation module 312 is implemented at least partially in hardware to transform the definition of the characteristic for each vertex 120 from a floating point representation to a fixed point representation 314. The fixed point representation 314 includes a plurality of values that have different amounts of significance in defining the characteristic, one to another (block 204). The floating point transformation module 312, for instance, is configured to reduce each floating point representation of the definitions of the characteristics of the vertices 120 to a normalized fixed point data having a defined byte-length along with a floating point offset and scale factor.

The fixed point representation 312 is configured to include a series of values, each of which has different amounts of significance in the definition of the characteristic. For the position 304 characteristics, for instance, each successive value further refines the position of the vertex in three dimensional space. For example, a fixed point representation 314 of three bytes, the first is the most significant, followed by the second, and then the third. The first byte defines a general position in three-dimension space, the second byte in combination with the first byte further refines that generalized position, and the third byte in combination with the first and second bytes defines a final position of the vertex. Similar techniques are also applied by the floating point transformation module 312 to form fixed point representations 314 of texture 306, shading, and the surface normal 310. To avoid redundancy, surface normals 310 may be first converted to a polar, azimuthal form before being encoded as fixed bytes.

The fixed point representations 314 are then taken as inputs by an indexing module 316. The indexing module 316 is implemented at least partially in hardware to index the plurality of values of the fixed point representation of the definition of the characteristic based on the different amounts of significance, one to another (block 206). Continuing with the three-byte example above, the indexing module 316 may form indexes of the most significant bytes (i.e., the first values), the next-most significant bytes (i.e., the second values), and the least significant bytes (i.e., the third values) for each of the fixed point representations 314 in storage 114. Output of the three dimensional digital content is controlled based on the indexed plurality of values (block 208) from the storage 114, such as based on these different amounts of significance as further described in the following.

Figure 4:
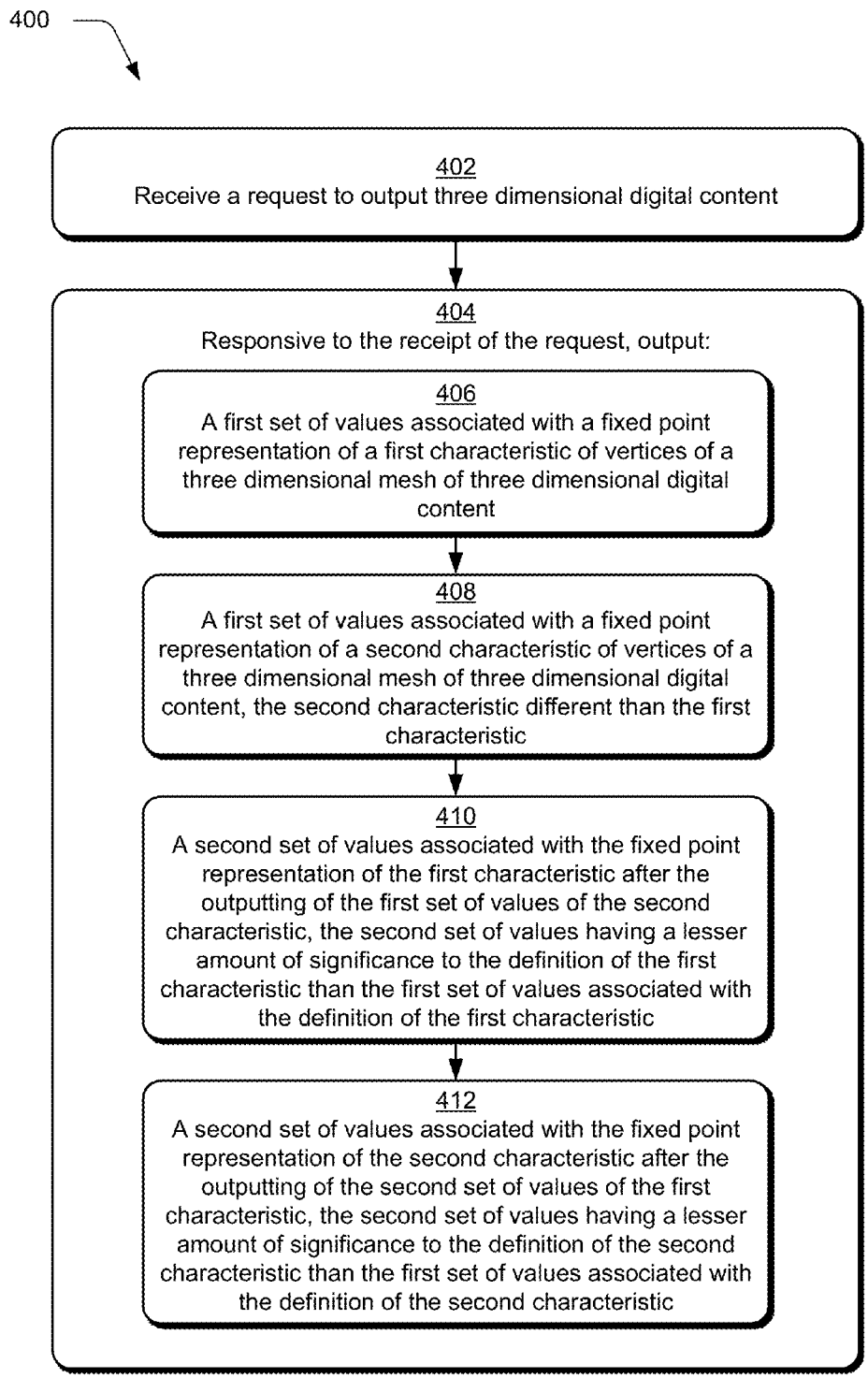
FIG. 4 is a flow diagram depicting a procedure in an example implementation in which output of three dimensional digital content is controlled based on an index of FIGS. 2 and 3.
Figure 5:
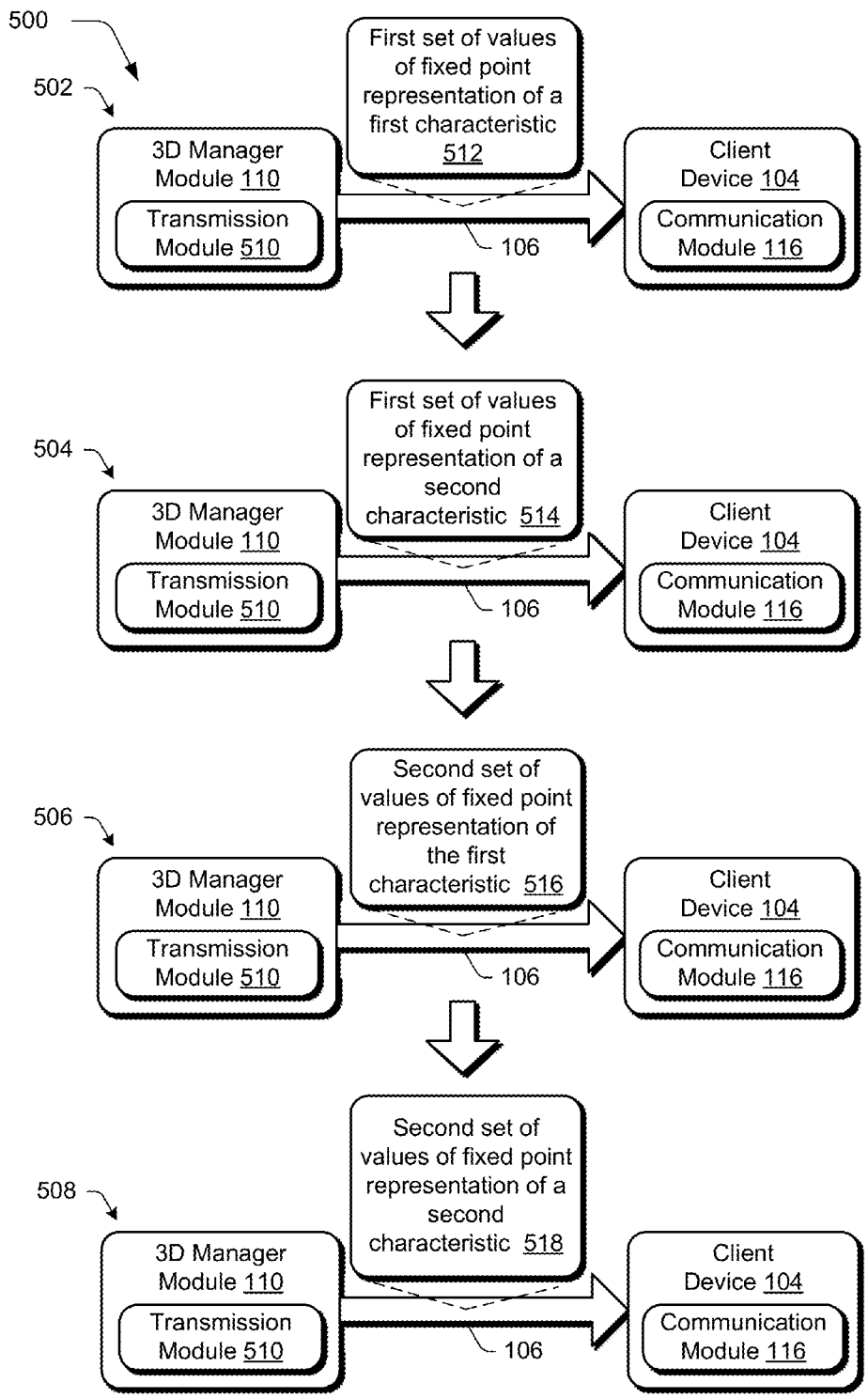
FIG. 5 depicts a system in an example implementation showing operation of the three dimensional manager module of FIG. 3 in greater detail as controlling output of three dimensional digital content.

FIG. 4 depicts a procedure 400 in an example implementation in which output of 3D digital content 112 is controlled based on an index of FIGS. 2 and 3. FIG. 5 depicts a system 500 in an example implementation showing operation of the 3D manager module 110 of FIG. 3 in greater detail as controlling output of 3D digital content. The system 500 is illustrated using first, second, third, and fourth stages 502, 504, 506, 508.

The following discussion describes techniques that may be implemented utilizing the previously described systems and devices. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In portions of the following discussion, reference will be made interchangeably to both FIGS. 4 and 5.

A request is received to output three dimensional digital content (block 402). The request, for instance, may be transmitted by the client device 104 to the service provider 102 (e.g., a website provider) via the network 106 for the 3D digital content 112. In another example, the request is a user input received by the client device 104 to render the 3D digital content 112 locally by the device. For example, these techniques may be leveraged in an augmented or virtual reality scenario for progressive rendering from a central field of view to a peripheral field of view. This may be performed by progressing through the different amounts of significance in definition of characteristics of the three dimensional content 110 of the fixed point representations as further described below.

In response to the receipt of the request, the three dimensional digital content is output (block 404). To begin, a first set of values is output that are associated with a fixed point representation of a first characteristic of vertices of a three dimensional mesh of three dimensional digital content (block 406). The 3D manager module 110, for instance, selects the first set of values for a fixed point representation of a characteristic "position" 304 of the vertices 120 from the index. This first set of values are the "most significant" values in the definition of the position 304 by the fixed point representations 314 and thus provide a generalized location of the 3D mesh 118.

As shown at the first stage 502, a transmission module 510 of the 3D manager module 110 is configured to transmit the first set of values of the fixed point representation of the first characteristic 512 over the network 106 to the client device 106. The client device 104 renders the 3D mesh 118 formed by the position 304 in real time as received via the network 106.

A first set of values is then output that are associated with a fixed point representation of a second characteristic of vertices of a three dimensional mesh of three dimensional digital content. The second characteristic is different than the first characteristic (block 408). Continuing with the previous example, after the first set of values of the first characteristic "position" 304 are transmitted by the 3D manager module 110, a first set of values for a fixed point representation of a second characteristic 514 (e.g., "texture" 306) are transmitted by the transmission module 510. The values are also rendered by the client device 104 in real time as received via the network 106. Thus, like the position 304 characteristic, the first set of values of the fixed point representation for "texture" are the "most significant" values in the definition of the texture 306 by the fixed point representations 314 and thus provide a generalized texture of the 3D mesh 118.

In this way, a user is exposed to a generalized rendering of positions 304 and texture 306 of the three dimensional content 112 in an efficient manner by leveraging the "most significant" bytes of respective fixed point representations. This generalized rendering is then refined using successive bytes in the fixed point representations as follows.

As shown at the third stage 506, a second set of values is output that are associated with the fixed point representation of the first characteristic 516 after the outputting of the first set of values of the second characteristic. The second set of values have a lesser amount of significance to the definition of the first characteristic than the first set of values associated with the definition of the first characteristic (block 410). The second set of values, for instance, may correspond to the second byte in the series of the fixed point representations for "position" 304 for the vertices 120 of the 3D mesh 118.

The second byte, in combination with the first byte further refines a defined position of the vertices 120 in three dimensional space. For example, some of the vertices 120 may have matching values for the first byte and thus may be transmitted as a single value. A portion of these vertices may, however, have different values for the second byte in the fixed point representation and thus further refine the definition of position 304 for the three dimensional content 112.

A second set of values associated with the fixed point representation of the second characteristic after the outputting of the second set of values of the first characteristic. The second set of values have a lesser amount of significance to the definition of the second characteristic than the first set of values associated with the definition of the second characteristic (block 412). The second set of values, for instance, may correspond to the second byte in the series of the fixed point representations for "texture" 306 for the vertices 120 of the 3D mesh 118. As above, the second byte, in combination with the first byte further refines a defined texture 306 of the vertices 120 as part of the three dimensional digital content 112. This process may continue for increasingly "less significant" values of the fixed point representation to further refine the three dimensional digital content 112, e.g., to a third byte, fourth byte, and so forth. In this way, progressive transmission and rendering is supported in an unsupervised manner that does not increase an overall size of the data used to define the three dimensional digital content 112.

Figure 6:
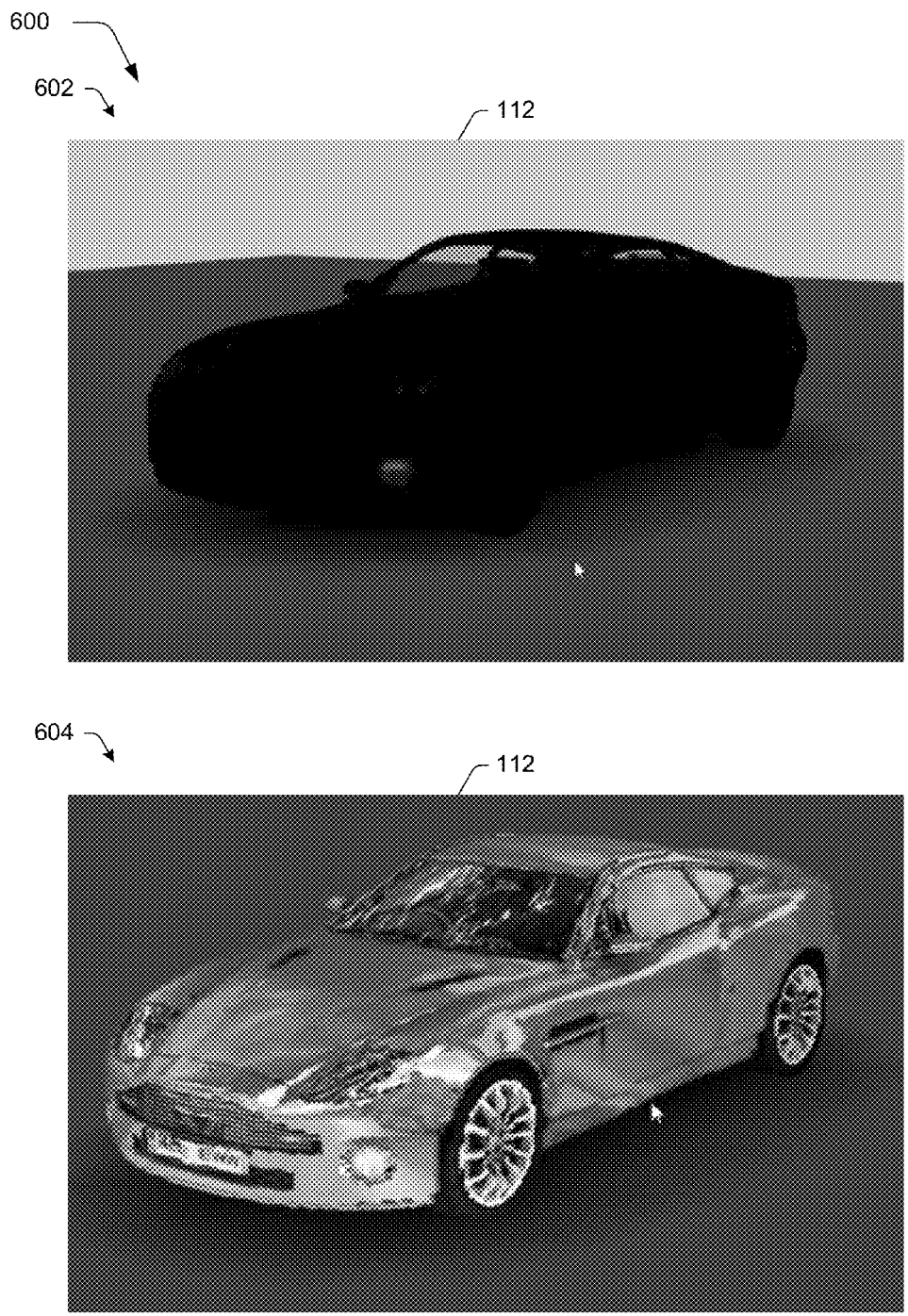
FIGS. 6, 7, and 8 depict example implementations of incremental rendering of three dimensional digital content in real time as different values having different amounts of significance in the definition of characteristics of three dimensional digital content are received.
Figure 7:
Figure 7:
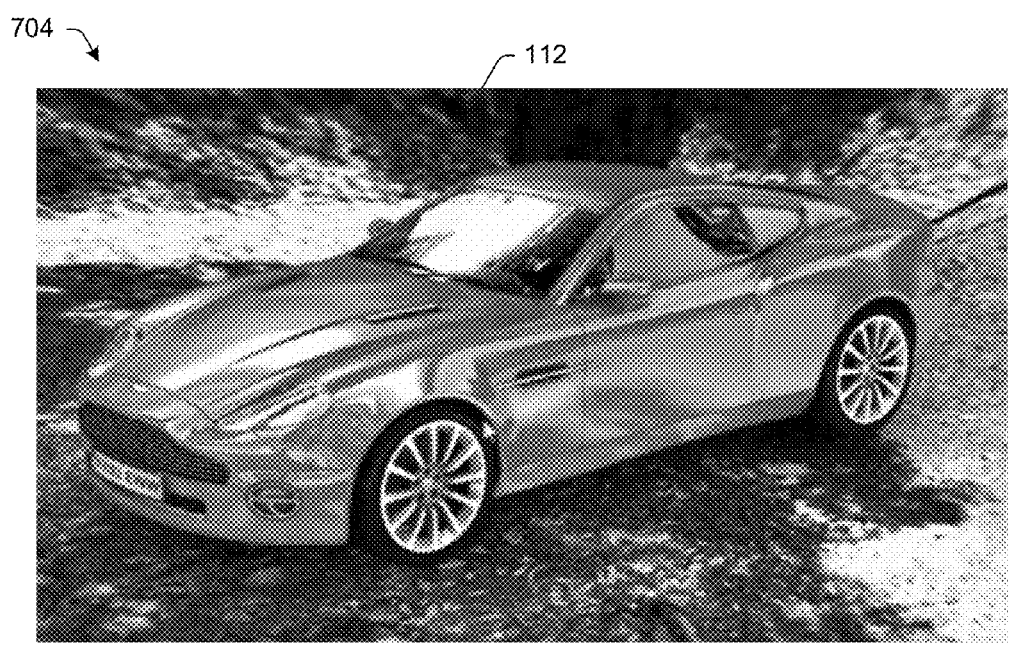
Figure 8:
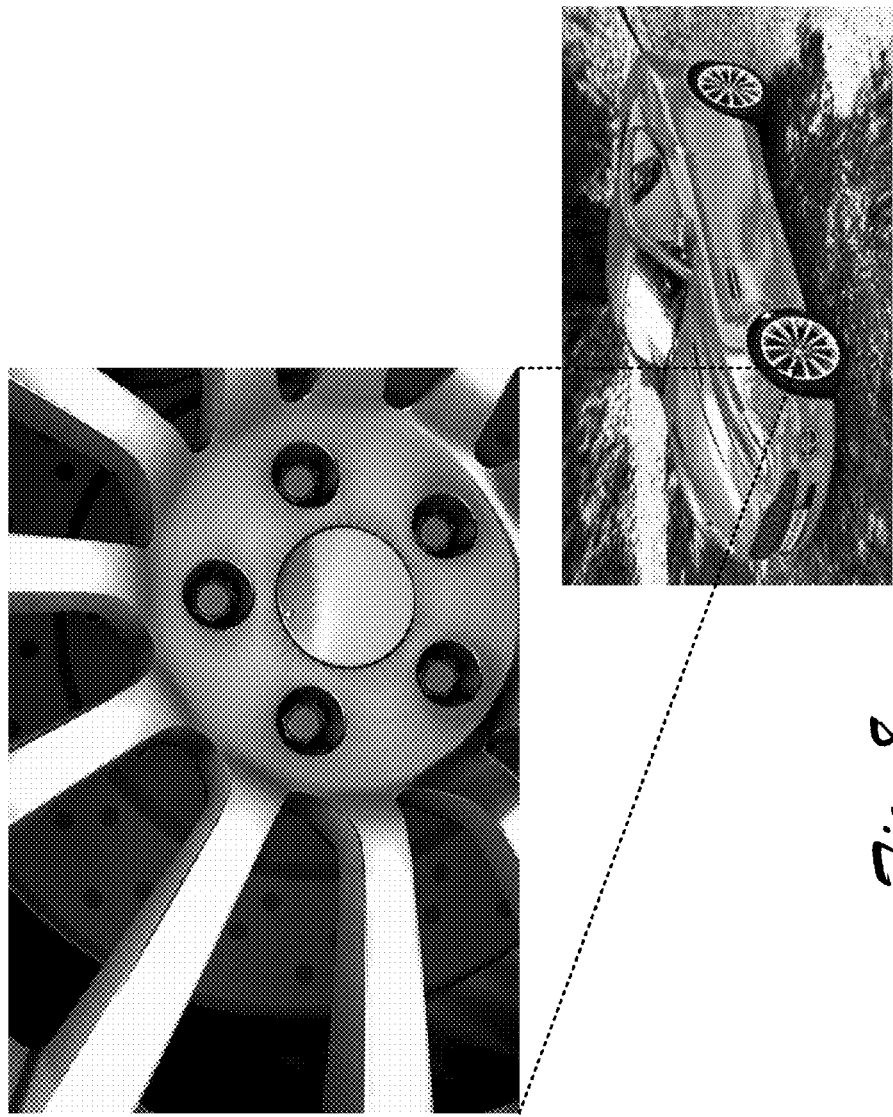

FIGS. 6, 7, and 8 depict example implementations 600, 700, 800 of progressive rendering of three dimensional digital content 112 in real time as different values having different amounts of significance in the definition of characteristics of three dimensional digital content are received. At a first stage 602 of FIG. 6, an initial display of 3D digital content 112 is shown as formed from the "most significant" values that define different characteristics of the three dimensional digital content 112, e.g., position 304 and texture 306.

At the second stage 604, a second set of values from the fixed point representations 314 are used to further refine the three dimensional digital content 112 such that the user may being to view sharper colors and definition of the content. In this way, a user is engaged with the 3D digital content 112 as it is received and is given immediate context regarding shape and color of the content.

This process continues for the first and second stages 702, 704 of FIG. 7. As illustrated, the progressive refinement of the 3D digital content 112 also enables a user to interact with the content as it is being received, such as to change a viewing direction. Thus, a user may move and view the 3D digital content as it is being received, thereby promoting efficient user engagement. As illustrated in FIG. 8, this supports successive provision of different levels of detail automatically without forcing a user to manually create different fidelities of the model as required in conventional techniques. For example, through successive transmission of values having different significance to a definition of a characteristic of the content, different levels of detail are provided from an overall outline of the car, to components of the car (e.g., hood, windshield, wheels), and features of those components, such as bolts of the wheels. These techniques may also be configured to leverage relationships between characteristics to further improve efficiency in transmission and rendering of the 3D digital content 112 as further described in the following.

Returning again to FIG. 3, the indexing module 316 may incorporate a variety of additional considerations in the indexing of the 3D digital content. An example of this is illustrated as a wedge formation module 318 that is implemented at least partially in hardware to form wedges 320 from the fixed point representations 314. Each of the wedges 320 represents a unique combination of vertex data.

Although this may result in some repetition of vertex data such as position 304, it means that a single triplet of wedge indices is sufficient of fully define a triangle (or other polygon using respective numbers of indices) and all of its associated vertex data.

Wedges 320, for instance, are formed from a combination of vertices 120 that have different positions 304, but same textures 306, shading 308, and surface normal 310 and thus may be used to reduce an amount of information stored and transmitted by the 3D manager module 110 by indexing in storage 114.

The wedges 320 are then accepted as inputs by a wedge ordering module 322. The wedge ordering module 322 is implemented at least partially in hardware to form a list of ordered wedges 324 according to a combined value of the most significant values (e.g., bytes) of the respective positions 304, e.g., fixed-point coordinate components. This increases the efficiency in which the bytes of the values can be compressed and mitigates against repetition of vertex data in the wedges 320.

The ordered wedges are then provided to a grouping module 326 to form groups 328. The groups are formed by the grouping module 326 according to a coordinate byte component (i.e., value of the position 304) at which the triangles (or other polygons in other examples) become non-degenerate. In this context, a degenerate triangle (or other polygon) is one that has two or more vertices 120 with the same coordinate. This grouping allows triangles to be transmitted when there is appropriate coordinate data on the client side to render the triangles. This approach also insures that those triangles that are output form a topologically complete mesh without holes or other complications that might cause artifacts when rendering. The grouping module 326 may also form the groups 328 according to an object, to which, triangles formed from the ordered wedges 324 belong, e.g., objects that form the car in the illustrated example of FIGS. 6-8.

The groups 328 are then taken as an input by the sorting module 330. The sorting module 330 is implemented at least partially in hardware to sort the groups 328 with respect of a visible surface of the object, e.g., using a ray tracing technique. The sorted groups 328 are then indexed in storage 114 to control output, e.g., transmission and rendering, of the 3D digital content 112 as further described in the following.

Figure 9:
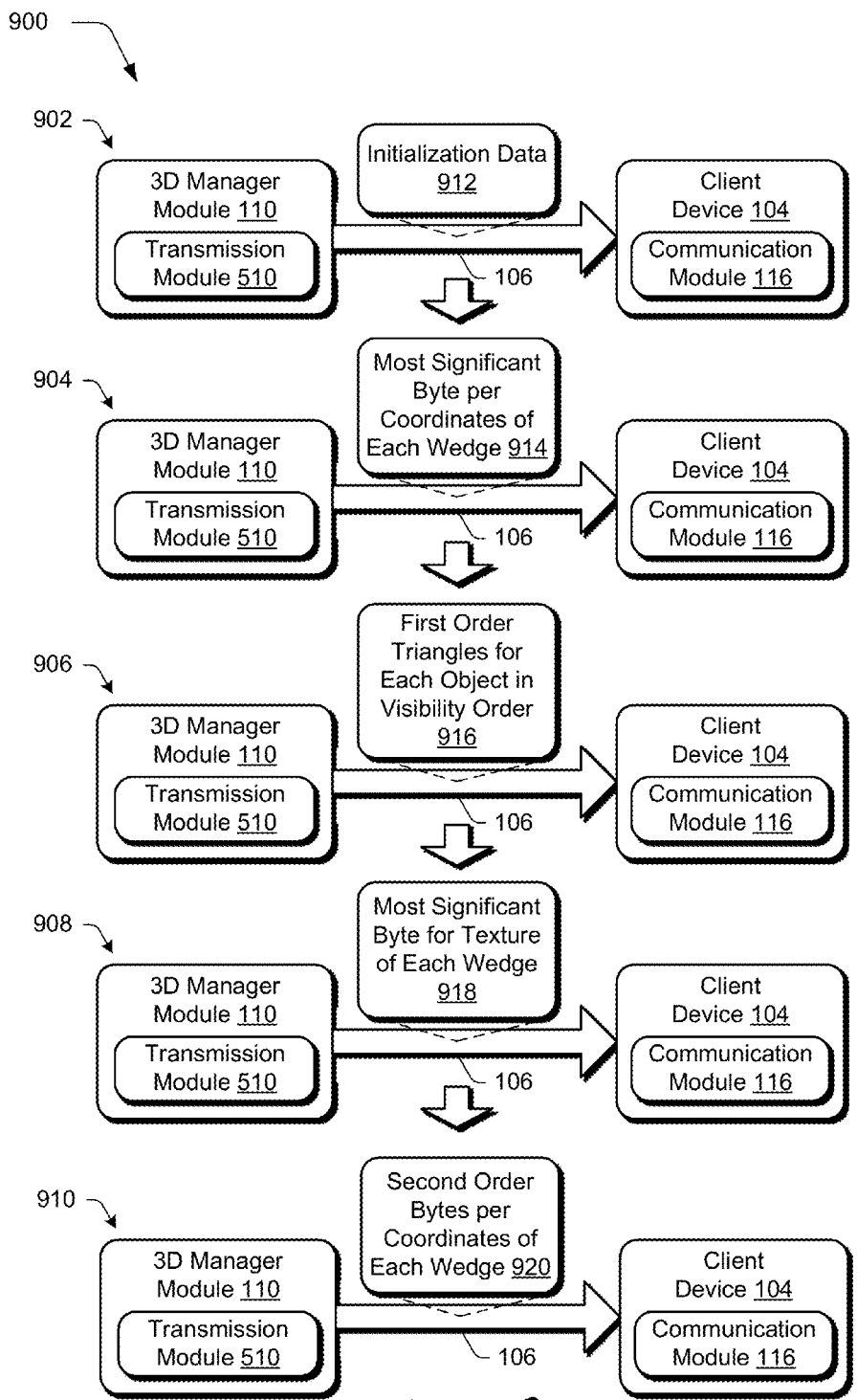
FIGS. 9 and 10 depict systems in example implementations in which three dimensional digital content as indexed by an indexing module of a three dimensional manager module of FIG. 3 is used to control output.
Figure 10:
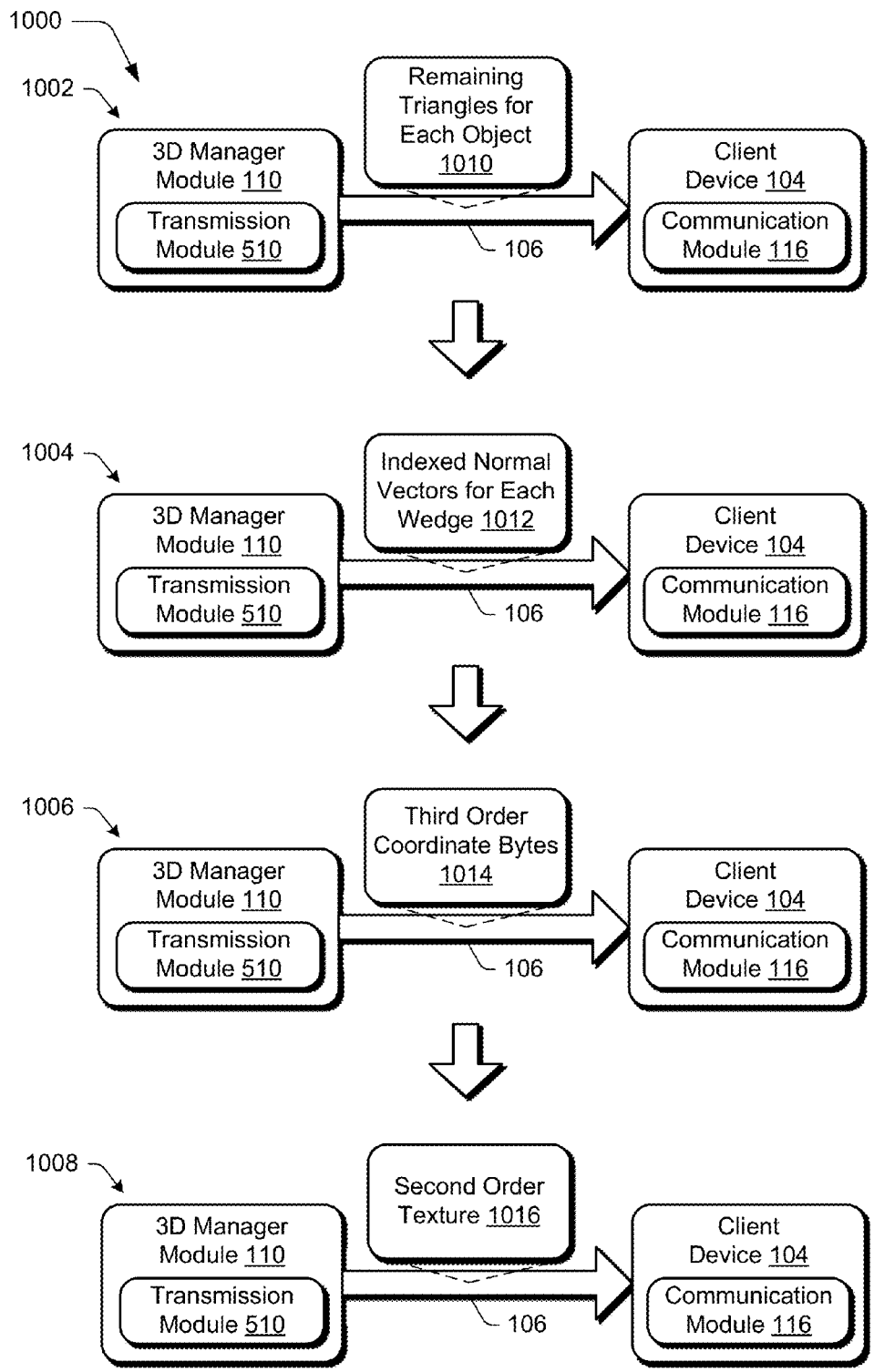

FIGS. 9 and 10 depict systems 900, 1000 in example implementations in which 3D digital content 112 as indexed by the indexing module 216 of the 3D manager module 110 of FIG. 3 is used to control output. These systems 900, 1000 are illustrated using first, second, third, fourth, and fifth stages 902, 904, 906, 908, 910 of FIG. 9 and first, second, third, and fourth stages 1002, 1004, 1006, 1008 of FIG. 10.

This example is described through use of triangles and bytes as instances of polygons and values of fixed point representations, respectively. Three values (e.g., bytes) are used to describe position 304 as part of a fixed point representation and two values (e.g., bytes) are used to describe texture 306 in the following. Additionally, use of an "ordering" term (e.g., first, second, and third orders) refer to an order of significance of corresponding items in the definition of a characteristic as described above. Further, although an ordering of the stages may be changed, in the following example transmission of data corresponding to each stage is completed until transmission of begun of data of the next stage.

At the first stage 902, the transmission module 510 begins by communicating initialization data 912, such a number of vertices, sizes of polygons, offset and scaling factor for each vertex coordinate, and so forth.

At the second stage 904, the transmission module 510 transmits the most significant byte per coordinates of each wedge 914 as indexed in storage. For example, the transmission module 510 transmits the most significant bytes for the x, y, and then z coordinates to define the position 304 of vertices 120 as previously described.

At the third stage 906, the transmission module 510 then transmits first order triangles for each object in order of visibility 916. Ray tracing, for instance, may be used to determine visibility of objects at a particular viewpoint for the 3D digital content 112. Further, the triangles are grouped accordingly to the object to which they belong as previously described, which is used to identify which triangles are considered first order.

Followed by this, at the fourth stage 908 the transmission module 510 transmits the most significant byte per texture 306 of each wedge 914 as indexed in storage. Texture 306, for instance, may be defined as a coordinate having two values (e.g., bytes), and therefore the most significant byte for the texture 306 at each vertex is transmitted at this stage.

At the fifth stage 910, the transmission module 510 transmits the second order bytes per coordinates of each wedge 920, i.e., the next most significant bytes to define the position 304. In this way, the transmission module 510 first supplied information regarding position 304, texture 306, and polygons (e.g., triangles) used to form the 3D digital content such that a user may efficiency view this content while additional data is transmitted to further refine the content.

At the first stage 1002 of FIG. 10, the transmission module 510 transmits data described the remaining triangles for each object 1010. This is followed at the second stage 1004 by indexed normal vectors for each wedge 1012, e.g., the surface normals 310 of FIG. 3. At the fourth stage 1006, the transmission module 510 transmits third order coordinate bytes 1014 (i.e., the third value of the fixed point representation of position 304), which are then followed by the second order texture 1016 values. In this way, incremental transmission and rendering is achieved by leveraged significance of values of fixed pointed representations as indexed in storage 114.

Example System and Device

Figure 11:
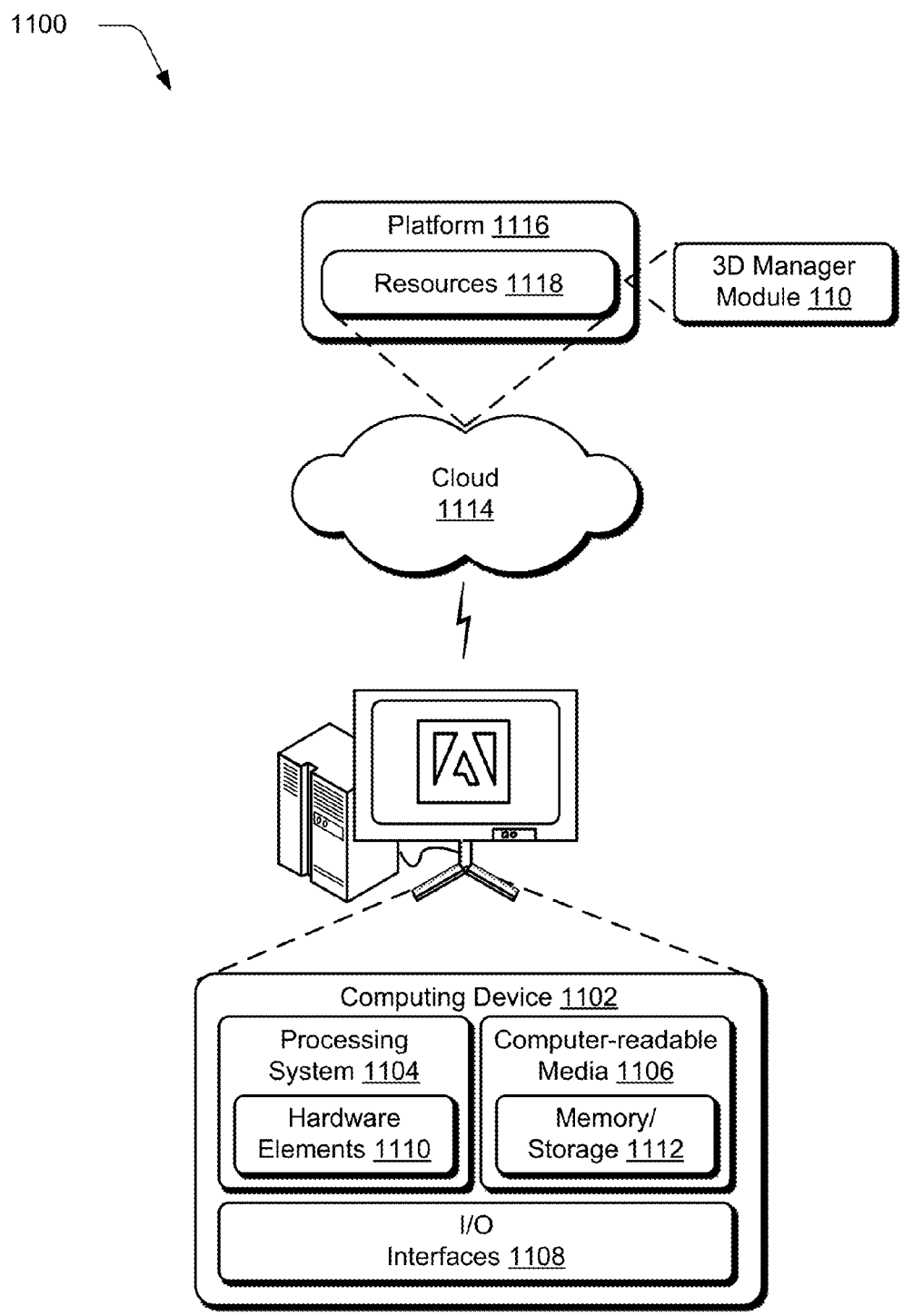
FIG. 11 illustrates an example system including various components of an example device that can be implemented as any type of computing device as described and/or utilize with reference to FIGS. 1-10 to implement embodiments of the techniques described herein.

FIG. 11 illustrates an example system generally at 1100 that includes an example computing device 1102 that is representative of one or more computing systems and/or devices that may implement the various techniques described herein. This is illustrated through inclusion of the 3D manager module 110. The computing device 1102 may be, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interface 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1106 is illustrated as including memory/storage 1112. The memory/storage 1112 represents memory/storage capacity associated with one or more computer-readable media. The memory/storage component 1112 may include volatile media (such as random access memory (RAM)) and/or nonvolatile media (such as read only memory (ROM), Flash memory, optical disks, magnetic disks, and so forth). The memory/storage component 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 1102 and/or processing systems 1104) to implement techniques, modules, and examples described herein.

The techniques described herein may be supported by various configurations of the computing device 1102 and are not limited to the specific examples of the techniques described herein. This functionality may also be implemented all or in part through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 may include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 may abstract resources and functions to connect the computing device 1102 with other computing devices. The platform 1116 may also serve to abstract scaling of resources to provide a corresponding level of scale to encountered demand for the resources 1118 that are implemented via the platform 1116. Accordingly, in an interconnected device embodiment, implementation of functionality described herein may be distributed throughout the system 1100. For example, the functionality may be implemented in part on the computing device 1102 as well as via the platform 1116 that abstracts the functionality of the cloud 1114.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment, a method implemented by at least one computing device, the method comprising:
    receiving, by the at least one computing device, three-dimensional digital content having a three-dimensional mesh of a plurality of vertices that include a characteristic of the three-dimensional content;
    forming, by the at least one computing device, a plurality of wedges from combinations of the plurality of vertices;
    transforming, by the at least one computing device, the characteristic for the plurality of vertices from a floating point representation to a fixed point representation, the fixed point representation including a plurality of values that have different respective amounts of significance in defining the characteristic;
    indexing, by the at least one computing device, the plurality of values based on the different respective amounts of significance and the formed plurality of wedges by ordering the plurality of wedges according to a combined amount of the significance of the values of the fixed point representations of a combination of the plurality of vertices that form respective wedges of the plurality of wedges; and
    controlling, by the at least one computing device, output of the three dimensional digital content based on the indexed plurality of values.

2. The method as described in claim 1, wherein:
    the fixed point representation has a predefined length of a plurality of bytes,
    a first value of the plurality of values is represented in the fixed point representation as a first byte of the plurality of bytes; and
    a second value of the plurality of values is represented in the fixed point representation as a second byte of the plurality of bytes, the second value having a lesser amount of significance in defining the characteristic than the first value.

3. The method as described in claim 1, wherein the plurality of values are arranged in succession as defining decreasing amounts of significance of the characteristic.

4. The method as described in claim 1, wherein the characteristic is a coordinate in three dimensional space.

5. The method as described in claim 1, wherein the characteristic is a texture, shading, or a surface normal.

6. The method as described in claim 1, further comprising:
    forming, by the at least one computing device, a plurality of groups of polygons from the ordered plurality of wedges, the plurality of groups corresponding to respective ones of a plurality of objects in the three dimensional digital content; and
    sorting, by the at least one computing device, the plurality of groups with respect to visibility of a surface area of respective said objects in the three dimensional digital content, and wherein the indexing is based at least in part of the sorted plurality of groups.

7. The method as described in claim 1, wherein the controlling of the output includes displaying the three dimensional digital content based on the indexed plurality of values or transmitting the three dimensional digital content over a network based on the indexed plurality of values.

8. In a digital medium environment, a system implemented by at least one computing device, the system comprising:
    a floating point transformation module, implemented at least partially in hardware of a computing device, to transform a characteristic for a plurality of vertices in a three dimensional mesh of three-dimensional digital content from a floating point representation to a fixed point representation, the fixed point representation including a plurality of values that have different respective amounts of significance in defining the characteristic;
    a wedge formation module to form a plurality of wedges from combinations of the plurality of vertices;
    an indexing module, implemented at least partially in hardware of a computing device, to index the plurality of values based on the different respective amounts of significance and the formed plurality of wedges by ordering the plurality of wedges according to a combined amount of the significance of the values of the fixed point representations of a combination of the plurality of vertices that form respective wedges of the plurality of wedges; and
    a transmission module, implemented at least partially in hardware of a computing device, to control transmission of the three dimensional digital content based on the indexed plurality of values.

9. The system as described in claim 8, wherein the characteristic is a coordinate in three dimensional space, a texture, shading, or a surface normal.

10. The system as described in claim 8, further comprising:
- a grouping module configured to form a plurality of groups of polygons from the ordered plurality of wedges, the plurality of groups corresponding to respective ones of a plurality of objects in the three dimensional digital content; and
- a sorting module configured to sort the plurality of groups with respective to visibility of a surface area of respective said objects in the three dimensional digital content, and wherein the indexing is based at least in part of the sorted plurality of groups.

11. The system as described in claim 8, wherein:
the fixed point representation has a predefined length of a plurality of bytes,
a first value of the plurality of values is represented in the fixed point representation as a first byte of the plurality of bytes; and
a second value of the plurality of values is represented in the fixed point representation as a second byte of the plurality of bytes, the second value having a lesser amount of significance in defining the characteristic than the first value.

12. The system as described in claim 8, wherein the plurality of values are arranged in succession as defining decreasing amounts of significance of the characteristic.

\* \* \* \* \*